UNITED STATES PATENT OFFICE.

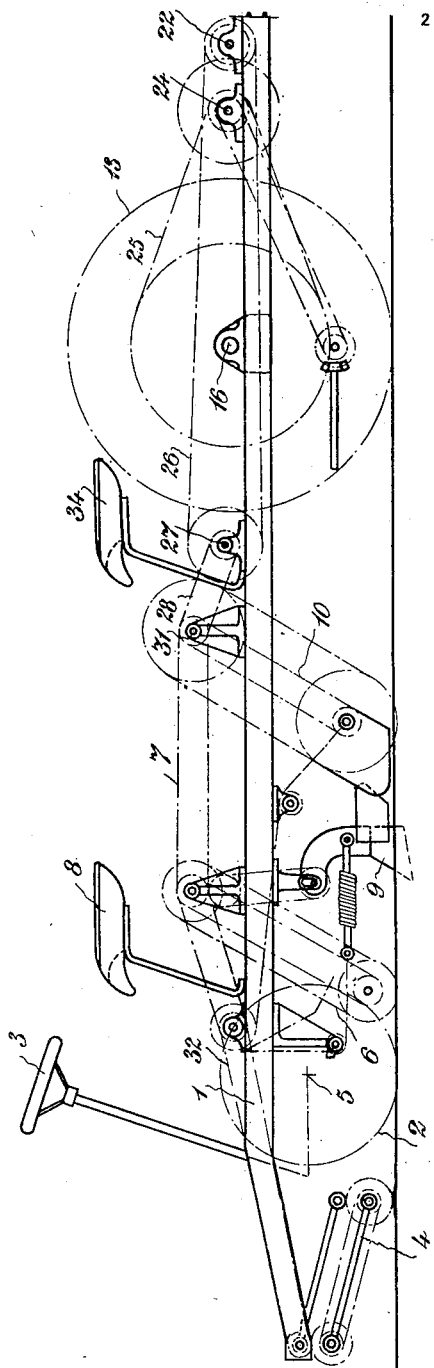

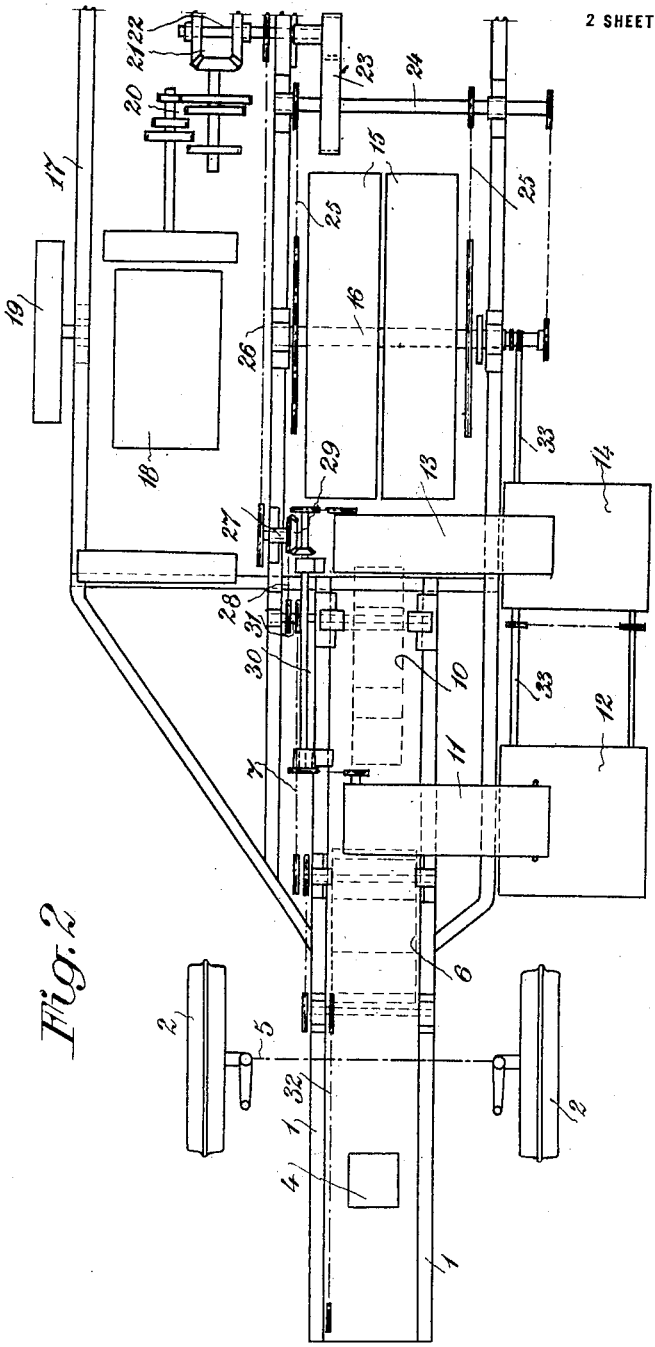

OLOF FRANKMAN, OF MALMO, SWEDEN.

MOTOR-DRIVEN BEET-HARVESTING MACHINE.

1,371,360.  Specification of Letters Patent.  Patented Mar. 15, 1921.

Application filed October 25, 1919. Serial No. 333,340.

*To all whom it may concern:*

Be it known that I, OLOF FRANKMAN, estate owner, a citizen of the Kingdom of Sweden, and residing at Malmo, Sweden, have invented a new and useful Motor-Driven Beet-Harvesting Machine, of which the following is a full, clear, and exact description.

My invention relates to a motor driven beet-harvesting machine. Previously proposed machines of this kind have not come to a practical use because of several drawbacks incident to the same. On account of the great number of various devices necessary in such machines for serving their purpose in a satisfactory manner great difficulties arise in combining said devices in such a way that they are not in the way of each other and that they are given their proper positions so as to cause them to coöperate in the desired manner. In addition thereto such machines are very complicated, bulky and heavy and require driving and supporting wheels of large dimensions, for which a suitable and sufficient space cannot be obtained without intruding upon the space and positions of the working parts of the machine. This circumstance has caused the devices for topping and loosening the beets, for raising the beets and tops from the ground and for their delivery from the machine to be considered as secondary only and the main interest has been laid upon the placing and construction of the driving and supporting wheels, so that the machine may be driven without damaging the growing beets and the power be transmitted to the wheels in an effective manner even when the machine is driven over a loose ground surface, and these circumstances have been determinating of the type of the machines.

According to my invention the supporting and driving wheels however are placed in such a manner, that they are absolutely independent of the distance between the growing beet rows, and all the working parts of the machine may be arranged at their proper positions relatively to the frame work and to each other in such a way that they coöperate in a correct manner without the necessity of complicated constructions for improving an unsuitable placing, and for making the parts accessible and easily surveyable.

These and other advantages are gained by placing all of the parts necessary for topping and lifting the beets and tops from the ground successively behind each other along the central longitudinal axis of the machine and by placing the supporting and driving wheels in one and the same vertical plane close behind said working parts. The motor is also mounted on a member extending to one side from the frame work at the side of the supporting and driving wheels.

By this arrangement the same machine may easily be used for harvesting beets, which grow in rows placed at different distances from each other, and if not quite impossible this however has been extremely difficult when using beet-harvesters of earlier types, as the broad supporting and driving wheels have been dependent on the distance between the beet rows. According to my invention the supporting and driving wheels rest upon that part of the ground, from which the beets and tops already are taken up. It is true that a smaller side wheel is arranged outside of or beneath the motor and this wheel sometimes must run between the beet rows, but this little wheel may easily be regulated upon its shaft to suit different distances between the rows, and it is never necessary to change the position of the main supporting wheels.

By placing the supporting and driving wheels behind all the working parts of the machine the ground surface is rolled or pressed together immediately after the beets are taken up, and the beets and tops are delivered upon a firm and even ground surface, which is of a great importance as it prevents earth from adhering to the beets and tops and besides their removal from the field is facilitated because the ground surface, pressed together by the heavy machine, easily supports the transport carriages and horses &c. and prevents them from sinking down therein.

By using my invention the harvesting may begin at any part of the field as the supporting and driving wheels always rest against the ground at a place, from which the beets already are removed. In earlier beet-harvesters, in which said wheels run between the growing beet-rows, they cannot be given the sufficient width for transmitting the supporting and driving power in a satisfactory manner, because tops as well as beets then would be damaged by the wheels. It is true that one of said wheels passing that part of the field, from which the beets already are removed, may be given a sufficient width, but the harvesting then cannot begin before at least two rows are harvested by hand so as to allow this broader wheel freely to pass.

By placing the motor behind all the working parts said parts are quite surveyable to the driver during the working and also the steering of the machine is facilitated thereby. Besides all the parts are easily accessible for examination and exchanges and neither the motor nor the supporting and driving wheels impede in any way the free movement of the working parts. By placing the motor in the manner described the whole machine will not be longer than a common horse driven machine and the power transmitting devices between the motor and the driving wheels are greatly simplified on account of the manner in which said parts are placed in relation to each other and the short distance between them.

The invention is illustrated in the accompanying drawing, in which Figure 1 shows a side view of a single-rowed beet-harvester. Fig. 2 shows a corresponding plan view of the same.

The machine consists of a horizontal frame 1 at the fore end supported by means of two smaller wheels 2, the distance between which may be altered so as to accommodate the distance between the growing beet rows. These wheels are in a known manner combined with a steering device, which may be managed from the steering wheel 3. A suitable topping device 4 is hinged to the fore end of the frame in front of the wheels 2, said device being placed in the central longitudinal vertical plane of the machine between the side bars of the frame. Close behind the shaft 5 of the wheels 2 a suitable elevator 6 is arranged for raising the tops from the ground, said elevator extending upward between the side bars of the frame and being driven by means of a chain or the like 7 at its upper end. The elevator 6 is arranged close behind the seat 8 for the person managing the steering, so that said person gets a free survey of the beet-row as well as the topping device 4. Close behind the elevator 6 the loosening device 9 for the beets is hinged to the frame 1 centrally between its side bars and behind said device an elevator 10 is arranged for raising the beets from the ground, said elevator extending upward centrally between the side bars of the frame and essentially parallel to the elevator 6. The upper delivering end of the elevator 6 is placed above an essentially horizontal belt conveyer 11 arranged in a right angle to the longitudinal axis of the frame, said belt conveyer extending outward to the left from the machine and ending in a receptacle 12, the bottom of which consists of a belt conveyer parallel to the conveyer first mentioned and automatically set into rotation at predetermined intervals for emptying the receptacle and delivering the tops in heaps or piles upon the ground. The upper delivering end of the elevator 10 for the beets is also arranged above a similar belt conveyer 13 preferably combined with suitable means for cleaning the beets from adhering earth. The conveyer 13 may also end in a receptacle 14 provided with a conveyer bottom in the manner described above, so that the beets gathered in the receptacle 14 are delivered upon the ground in heaps or piles at the same time as the tops.

The particulars described above may be varied with regard to circumstances, and the construction of the same does not directly form a part of the invention, for which only the placing of the parts in relation to the motor and to the supporting and driving wheels is of interest. In the modification shown in the drawing two broad supporting and driving wheels 15 are arranged adjacent to each other and symmetrically to the central vertical plane through the topping and loosening devices and elevators described above. Instead of these two adjacent wheels 15 mounted on a horizontal shaft 16 a single broader wheel may be used, in which the central plane perpendicularly to the shaft coincides with the central longitudinal vertical plane of the machine. This arrangement is however usually less attractive because the turning of the machine becomes more difficult the broader said wheels are. Preferably the wheels therefore are divided in more than two adjacent parts, which by means of a differential gear are able to rotate independently of each other.

At the side of the supporting and driving wheels the frame 1 is connected with a frame 17 extending sidewise to the right and intended to carry the motor 18, which thus is placed at the side of the wheels 15. The outermost part of the frame 17 is supported by a smaller wheel 19 arranged in such a way that it runs between two adjacent beet-rows, when the frame 17 extends to the right, as shown in the drawing, said wheel being movable perpendicularly to the longitudinal axis of the machine so as to accommodate the distance between the rows. When the machine is built for only a single row the motor preferably is placed to the right, as shown, because if placed to the left a sufficient track between the delivered tops or beets hardly may be found for the wheel 19.

If the machine however is built for simultaneously harvesting two rows, the motor and supporting wheel 19 may be placed on the left side of the machine, because an interspace then is formed between the delivered rows of beet and top heaps because they are delivered for every other growing beet row only. By placing the wheel 19 to the left no damages upon the growing beets are caused by sharp turnings of the machine.

In machines for simultaneously harvesting more than two rows one motor preferably is placed on each side of the machine. Then the supporting and driving wheels are preferably three or more in number and may be placed on two parallel shafts and provided or combined with belts in the manner known from "tanks."

The gearing devices between the different parts of the machine obviously may be arranged in various manners so as to suit the same purpose. In the modification shown in the drawing the change speed gear 20 is arranged behind the motor 18 and combined with a reversing gear 21 mounted on an intermediate shaft 22, from which the motor power by means of the differential gear 23 is transmitted to another intermediate shaft 24 connected with the shaft 16 by means of chain gears 25. The shaft 22 is connected with a shaft 27 by means of a chain 26, said shaft 27 driving the elevator 10 by means of a chain gear 28 and also a longitudinal shaft 30 by means of a bevel gear 29. The movement is transmitted from the shaft 30 to the belt conveyers 11 and 13. From the shaft 31 for driving the beet-elevator 10 the power is transmitted to the elevator 6 by means of a chain 7 and therefrom by a chain gear 32 to the topping device 4. The belt conveyers forming the bottoms of the receptacles 12 and 14 are driven from a common longitudinal shaft 33, which by suitable means are put into rotation either from one of the wheels 15 or from the shaft 24.

Directly in front of the supporting and driving wheels and the motor a seat 34 is arranged for the driver. The loosening device 9 for the beets and the two elevators 6 and 10 are combined with a raising device by means of chains, links or the like so that they can be raised or lowered simultaneously in relation to the ground, which device preferably can be coupled to the motor or a shaft driven therefrom by means of a lever so as to facilitate the raising or lowering of said devices.

As will be seen from the drawing the different parts of the machine may easily be arranged in such a manner that the weight is correctly distributed to the wheels, and counterbalanced in such a way that a suitable part thereof comes upon the steering wheels and the main part upon the supporting and driving wheels. The weight upon the wheel 19 may easily be regulated by placing the motor at a greater or smaller distance from the wheels 15.

Having now described my invention and in what manner the same is to be performed I declare that what I claim is:—

1. A beet-harvesting machine including a frame, a series of beet-harvesting elements carried by the frame, and arranged in line, and supporting and driving wheels adjacently mounted behind the harvesting elements and in line therewith.

2. A beet-harvesting machine including a frame, a series of beet harvesting elements, carried by the frame arranged in line one after the other, conveyers mounted on the frame, front supporting wheels and supporting and driving wheels adjacently mounted in the rear of, and in line with, said harvesting elements, whereby the driving wheels compress the dirt in the beet row after the beets are harvested leaving a broad smooth track, and the conveyers receive the beets from the harvesting elements and deliver them on the smooth track made by the driving wheels when harvesting the previous row.

In testimony whereof, I have signed my name to this specification in the presence of two subscribing witnesses.

OLOF FRANKMAN.

Witnesses:
 HJ. BRANZELL,
 GUNHILD PETERSSON.